Sept. 5, 1933.   E. E. LONG   1,925,194
LIFTING JACK
Filed May 28, 1932   4 Sheets-Sheet 1
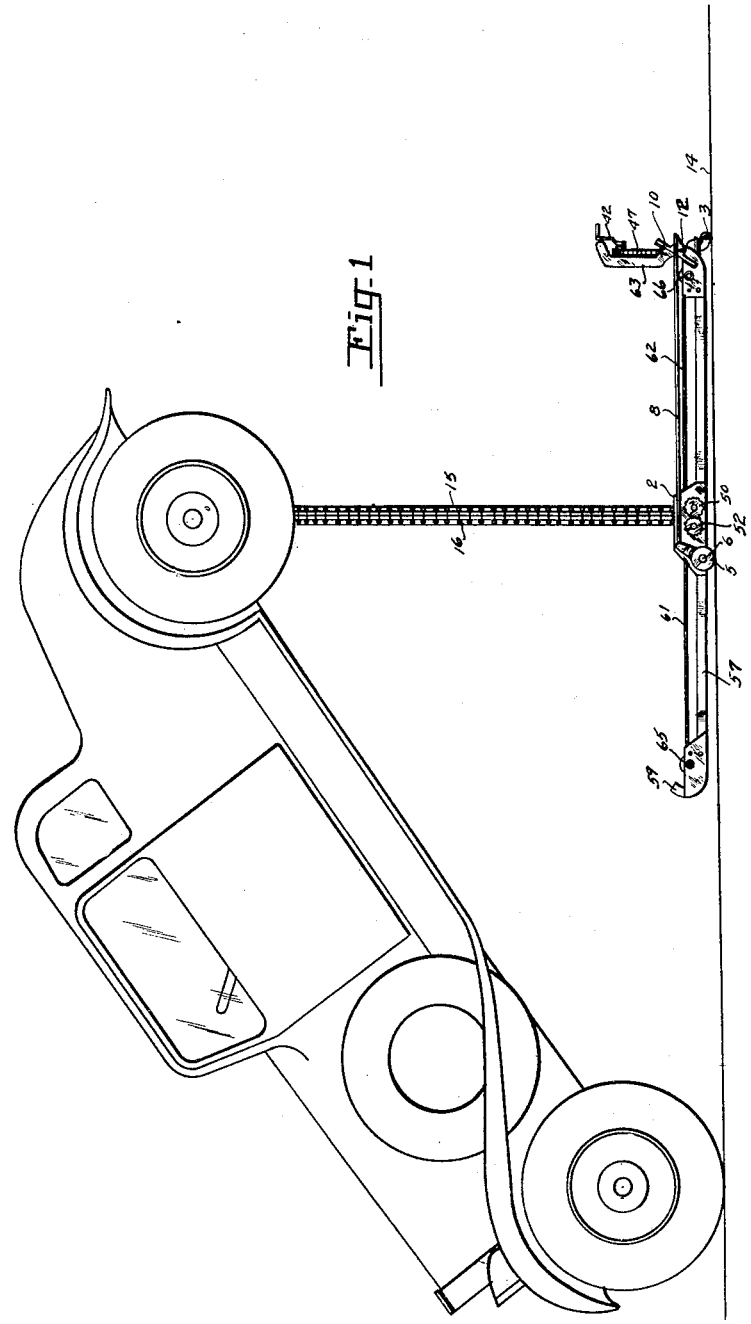
Inventor
*Eldridge E. Long*
By
Attorney Sept. 5, 1933.　　　　　E. E. LONG　　　　　1,925,194
LIFTING JACK
Filed May 28, 1932　　　4 Sheets-Sheet 2
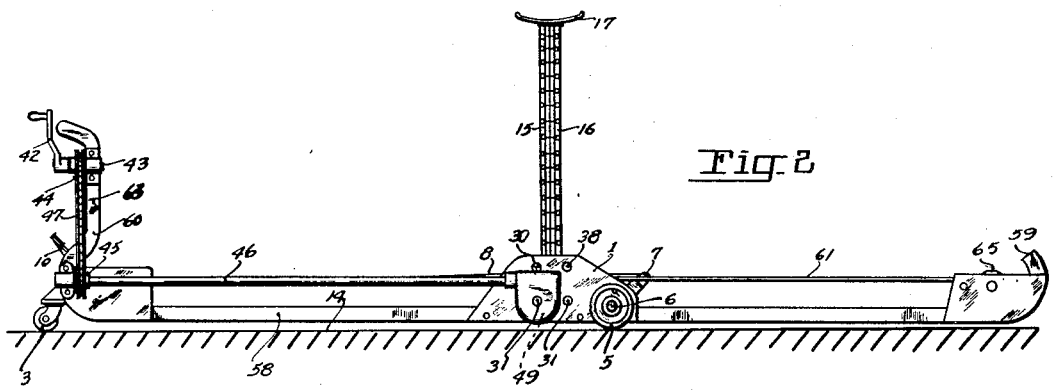
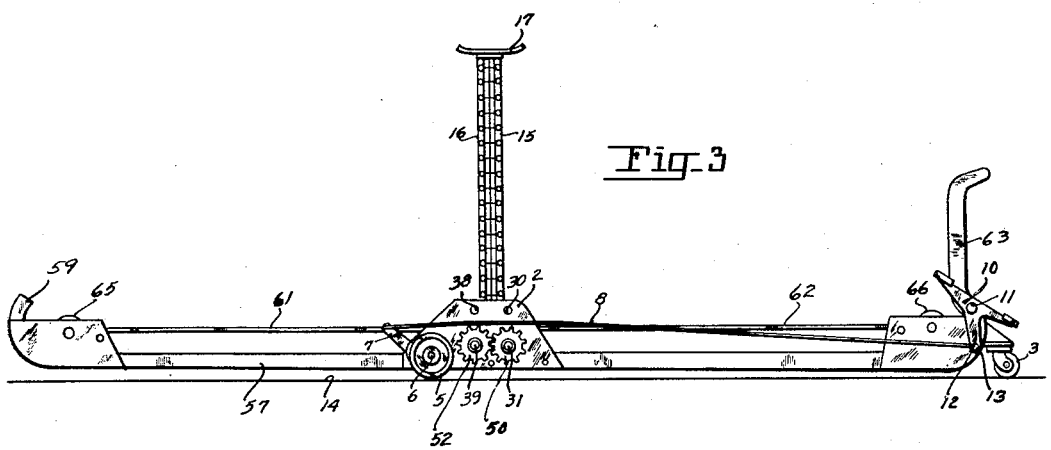
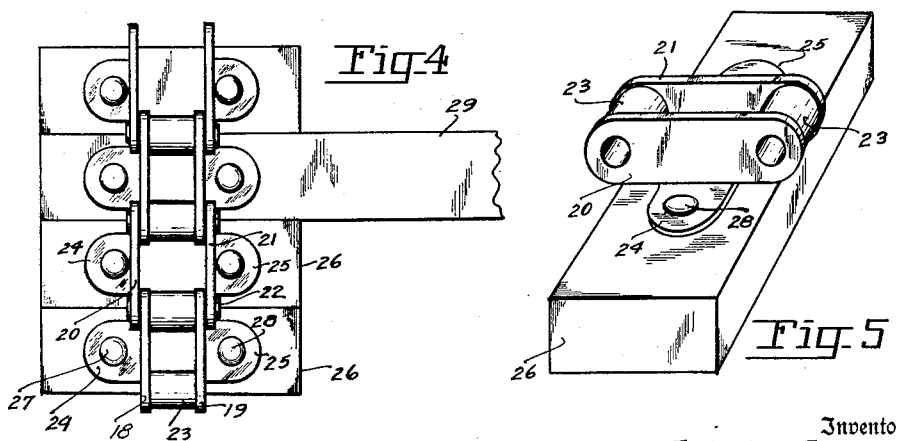
Inventor
Eldridge E. Long
By Thomas Bilyeu
Attorney Sept. 5, 1933.  E. E. LONG  1,925,194
LIFTING JACK
Filed May 28, 1932    4 Sheets-Sheet 3
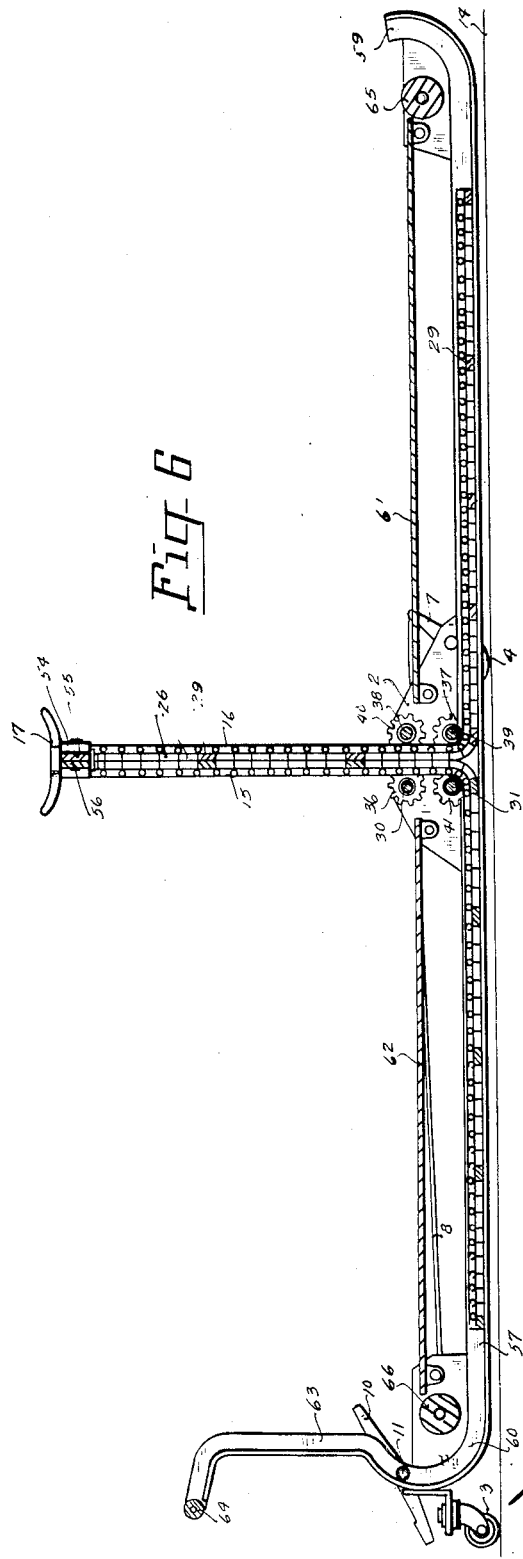
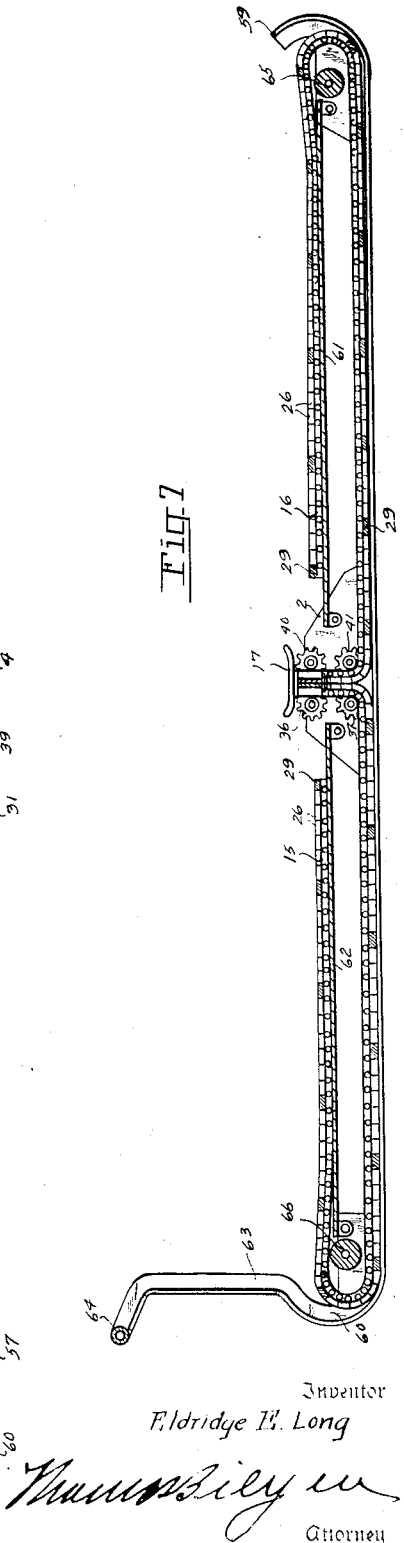
Inventor
Eldridge E. Long
Attorney Sept. 5, 1933.  E. E. LONG  1,925,194
LIFTING JACK
Filed May 28, 1932   4 Sheets-Sheet 4
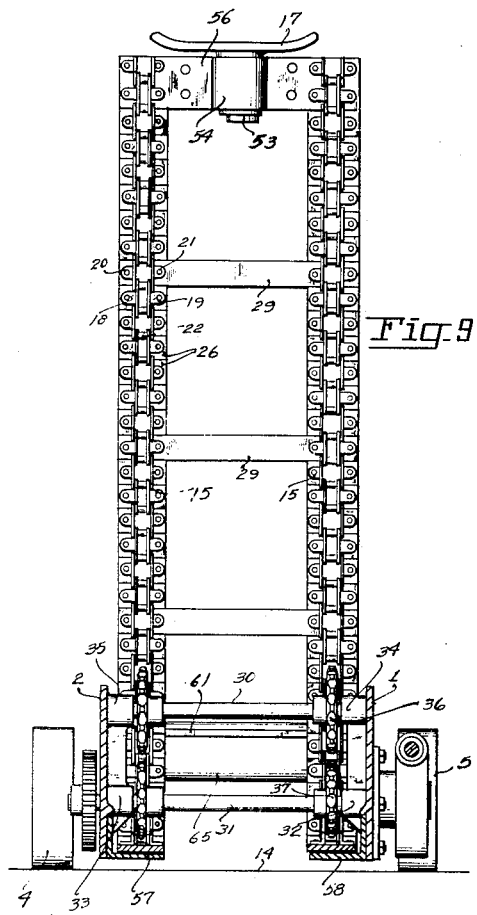
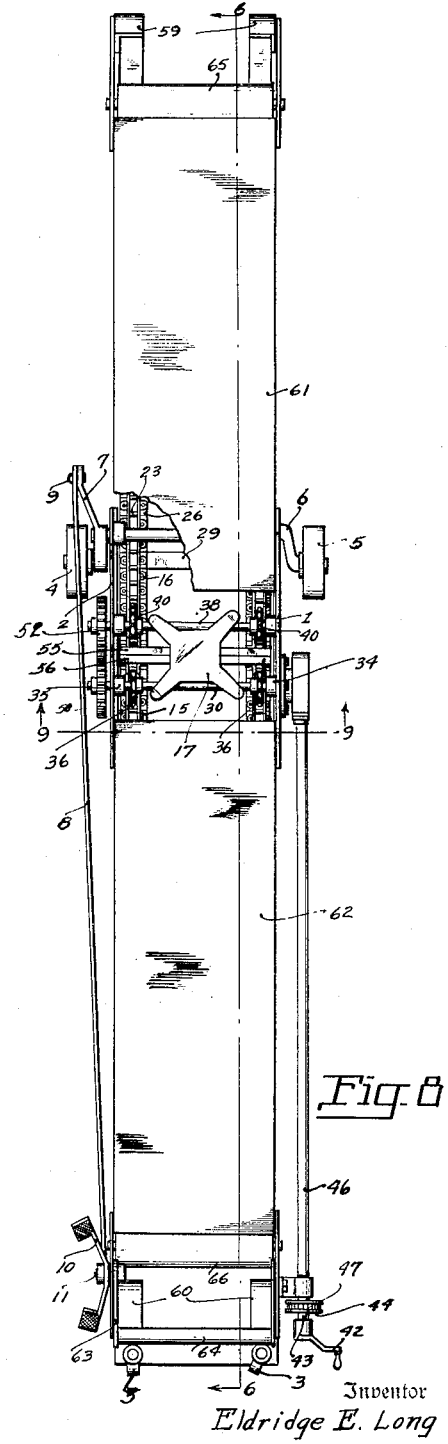
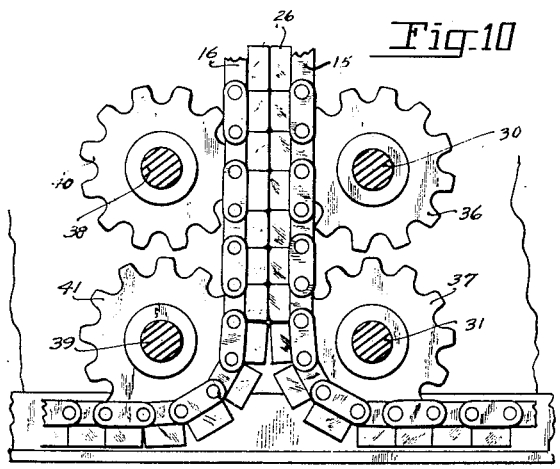
Inventor
Eldridge E. Long
Attorney Patented Sept. 5, 1933

1,925,194

UNITED STATES PATENT OFFICE 1,925,194

LIFTING JACK

Eldridge E. Long, Troutdale, Oreg., assignor of one-half to Anthony Zeller, Troutdale, Oreg.

Application May 28, 1932. Serial No. 614,143

4 Claims. (Cl. 254—6)

My invention relates to improvements in lifting jacks.

The invention is particularly adapted for use upon automobiles and is used to tilt the automobile at an angle for loading the car into freight cars for the transporting of the same, in car load lots, and for making the underside of the car available for work and inspection.

The invention is primarily comprised of a frame having a lifting head disposed centrally of the frame. The lifting head is adapted for being supported upon pairs of chains. The chains are comprised of chain links and blocks. The chain is adapted for being raised and lowered by sprockets so that the blocks will pile one upon the other, and for stabilizing the column when raised. When lowered the chain is adapted for being moved longitudinally of the frame and in either direction from its center, and for being returned within the frame to thereby limit the length of the frame. A steering tongue is associated with one end of the frame and the chain is adapted for being manipulated through a hand crank, a chain drive, and a worm and a worm wheel reduction. Means is also provided for raising and lowering the frame assembly relative to the floor to permit the maneuvering of the jack when loaded, or when empty, and for stabilizing the jack when carrying an elevated load.

One of the objects of my invention is to provide a jack having a high lifting range and one that may be placed beneath the axle, or other support of an automobile and one that may be used in the raising of the one end of the automobile to incline the automobile at an angle.

A further object of my invention consists in providing a lifting jack that may be used for the raising of an automobile, or other motor vehicle to facilitate inspection and work upon the automobile.

And a still further object of my invention consists in providing a lifting jack that may be placed under an extremely low load to be lifted and one that will have a maximum raising, or lifting capacity.

And a still further object of my invention consists in so constructing the lifting jack that it will be of rugged design and one that will have an extremely wide lifting range.

And a still further object of my invention consists in so supporting the central portion of the lifting jack that it will have a wide range of portability and maneuvering capacity.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view, of one of my new and improved jacks shown in place for the raising of an automobile and illustrating the automobile as being raised to incline the body at substantially 45 degrees to the horizontal.

Fig. 2 is a side view, of the assembled device, shown in raised position. This view is made to illustrate the side of the assmbled device upon which the lifting drive is disposed.

Fig. 3 is an opposite side view, of the device, as illustrated in Fig. 2.

Fig. 4 is a fragmentary, plan view, of the assembled chain made to illustrate the blocks and links comprising the chain.

Fig. 5 is a perspective, end view, of one of the blocks and the links associated therewith.

Fig. 6 is a sectional, side view, on line 6—6 of Figure 8 of the assembled device, shown raised.

Fig. 7 is a sectional, side view, shown in full lowered position.

Fig. 8 is a top, plan view, partially in section of the assembled device.

Fig. 9 is a sectional, end view, of the assembled device. This view is taken on line 9—9 of Fig. 8, looking in the direction indicated.

Fig. 10 is a fragmentary, sectional, side view of the driving sprockets and the rollers between which the chain is driven and elevated.

Like reference characters refer to like parts throughout the several views.

My invention is primarily comprised of a frame. The frame is composed of side rails 1 and 2. The frame is supported upon pilot wheels 3 disposed at the front, or steering end of the frame and a pair of central supporting wheels 4 and 5. The central supporting wheels 4 and 5 are mounted upon an axle 6. The axle 6 has an arm 7 secured thereto and the axle 6 is made in the form of a crank so that the body may be raised and lowered relative to the supporting surface through the manipulation of the crank 7. A link 8 is connected to the crank by a pin 9 and the link 8 is also connected to a foot lever 10. The foot lever 10 is rockably disposed about a journal pin 11. An arm 12 downwardly extends from the foot lever and the link 8 is secured to the arm 12 through the use of a connecting pin 13.

The primary purpose and object of so mounting the primary supporting wheels is to provide means for raising and lowering the frame relative to the supportinng surface 14 over which the same is to be manipulated. This not only gives greater maneuvering ability to the lifting jack but also provides a jack, the lower surface of the side frames of which may be made to rest directly upon the supporting surface when a relatively heavy load is to be lifted and to give stability to the jack while carrying the load and during the lifting of the load.

Pairs of chains 15 and 16 have a lifting saddle 17 secured to their adjacent meeting ends. Each of the chains is comprised of pairs of inner links 18 and 19 and pairs of outer links 20 and 21. The respective links are secured together by pins 22. Rollers 23 are disposed upon each of the pins. The rollers act as separators for the links and form a roller chain thereof. Feet 24 and 25 are disposed and outwardly extend from each of the links and each chain is comprised of the respective roller chain units and blocks 26. The blocks are secured to the chains by the passing of suitable fasteners, as screws 27 and 28, through the respective feet 24 and 25 that outwardly extend from the side links. At intervals cross bars 29 extend from chain to chain to afford stability to the chain units.

Axles 30 and 31 are journaled in suitable hubs 32, 33, 34 and 35, that are formed integral with the side frames, and sprockets 36 and 37 are mounted upon the axles 30 and 31. Additional cross shafts 38 and 39 are also journaled within the side frames and sprockets 40 and 41 are mounted upon the respective shafts 38 and 39. The purpose and object of the pairs of sprockets is to maintain a relatively tight working relationship between the sprocket and chains.

A hand crank 42 is disposed at the steering end of the jack assembly and the crank is secured to a shaft 43. A sprocket 44 is disposed upon the shaft 43 and a sprocket 45 is disposed upon the worm shaft 46. A driving chain 47 is trained about the respective sprockets 44 and 45 and a worm 48 is disposed upon the worm shaft 46. The worm is adapted to coact with and to drive a worm wheel 49, and the worm wheel 49 is disposed upon the axle 31 and drives the same. A gear 50 is disposed upon the axle 31 and the gear 50 coacts with the gear 52 that is secured to the shaft 39 to thereby drive the respective sprockets and rollers. This provides a chain assembly that is adapted for being driven at either side and for affording stability to the chain column when raised.

The saddle 17 has a king bolt 53 downwardly extending therefrom. The king bolt is journaled within a suitable bearing 54 that is formed integral with the respective stabilizing cross bars 55 and 56. This affords a saddle that is adapted for being rotated within the journal bearing 54.

Supports 57 and 58 run longitudinally of and extend inwardly from the side frames and upon these the blocks forming the chains are moved along. Reverse curves 59 and 60 are disposed at the oppositely disposed ends of the channelways to thereby cause the chain to reverse upon itself and to lie flat upon the chain supports 61 and 62. This lessens the length of the base of the lifting jack and maintains the assembly chain lying in a flat condition excepting where the same reverses within the curved ends 59 and 60. The chains are held in position within the return curved ends by rollers 65 and 66 that are journaled within the respective sides of the frames at their ends.

A steering tongue 63 upwardly extends from the steering end of the assembly and a handle 64 is supported by the upper end of the tongue.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of side rails, a pilot wheel disposed at one end of the side rails, pairs of roller chains secured together on their one end by stabilizing cross bars, said cross bars being enlarged at their centers to form a vertical bearing, a saddle having a projection formed integral therewith and extending downwardly therefrom and pivotally supported by the bearing in said cross bars, the roller chains being comprised of side links secured together by pins and rollers, a block secured to each pair of links comprising the side chains, said blocks being adapted to rest one upon the other when the chain is elevated in a vertical position, and manually manipulative means disposed at one end of the side rails adapted for raising and lowering the chains, said means including a plurality of sprocket wheels rotatably mounted within the side frames and about which the chains are trained, and means for rotating said sprocket wheels extending to one end of said frame.

2. In a device of the class described, the combination of side rails, supporting wheels associated with the side rails, pairs of chains disposed within the side rails and adapted for being moved in either direction, longitudinally of the side rails, stabilizing cross bars securing the chains together upon their one end, a saddle rotatably journaled and supported by the stabilizing cross bars, said pairs of chains carrying blocks, said blocks of each pair of chains being adapted for resting, one upon the other, when the chains are elevated to form a supporting column of the chains, and means carried by the assembly for raising and lowering the chains.

3. In a device of the class described, including an elongated and jack supporting frame, a pilot wheel pivotally mounted at the forward end of the frame, a crank arm pivotally mounted to the side of the frame approximately at the center thereof, an axle rotatably mounted through the frame and having offset ends with one of said ends connected to the crank arm, wheels rotatably mounted on the offset ends, a link connected to the crank arm and extending to one end of the frame and means for imparting motion to the link for raising and lowering said frame with respect to the supporting wheels.

4. In a device of the class described, the combination of an elongated horizontal frame, a pair of chains slidably mounted within the frame and arranged at opposite sides thereof, each chain comprising a plurality of links joined together by pins and rollers, a block secured to each link, one end of said chains being interconnected by a pair of cross bars enlarged at their center to form a vertical bearing, a saddle pivotally mounted upon the cross bars by a projection formed integral therewith and extending downwardly through the bearing, sprocket wheels rotatably mounted on each side of the frame and embraced by said chains, means for rotating said sprocket wheels and advancing said chains and the blocks attached thereto vertically from the frame into column formation, said means including a worm drive for the shaft of certain of the sprocket wheels and an actuating shaft for the worm drive extending to one end of the frame.

ELDRIDGE E. LONG.